United States Patent [19]

Nylund

[11] 4,042,000
[45] Aug. 16, 1977

[54] DEVICE FOR TIRE CHAINS

[76] Inventor: Kåre Jørgen Nylund, Makeveien 2, 4500 Mandal, Norway

[21] Appl. No.: 683,703

[22] Filed: May 6, 1976

[51] Int. Cl.² .............................................. B60C 27/06
[52] U.S. Cl. ................................ 152/213 A; 152/218; 152/241
[58] Field of Search ............... 152/213 R, 213 A, 233, 152/241, 242, 243, 239, 217, 218, 219

[56] References Cited
U.S. PATENT DOCUMENTS

| | | | |
|---|---|---|---|
| 957,309 | 5/1910 | Corrington | 152/239 |
| 1,598,271 | 8/1926 | Edwards et al. | 152/239 |
| 2,082,937 | 6/1937 | Bambenek | 152/213 A |

Primary Examiner—Drayton E. Hoffman
Attorney, Agent, or Firm—Browdy & Neimark

[57] ABSTRACT

To improve the mounting and handling of tire chains there is provided a device which easily and quickly can be attached and dismantled by anyone without tools. The device comprises two attaching bars whereby the first bar is fastened to a gripping element with an eye on each side and the second one is fastened to a gripping element with an eye and is formed with a hook on the other end, turned in 90°. The hook is hooked around the first bar, slips down toward the eye and the device is attached.

3 Claims, 5 Drawing Figures

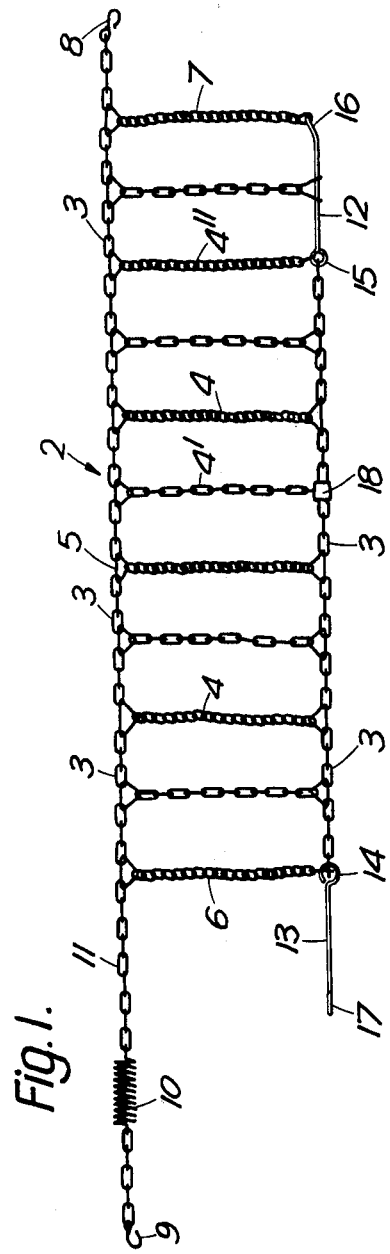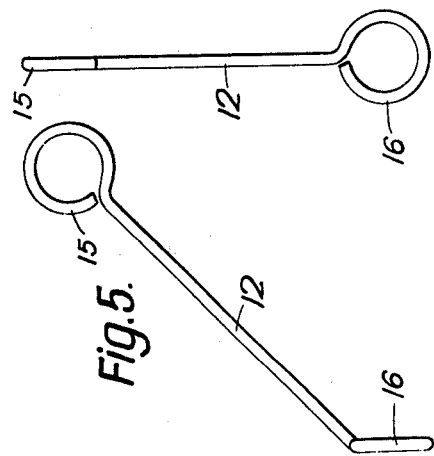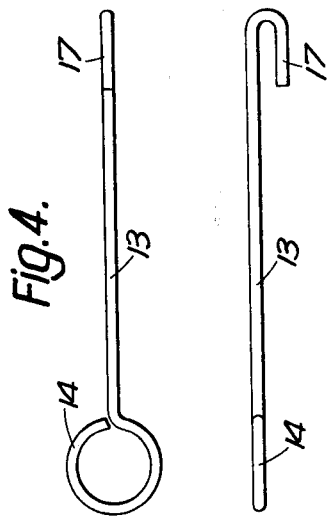

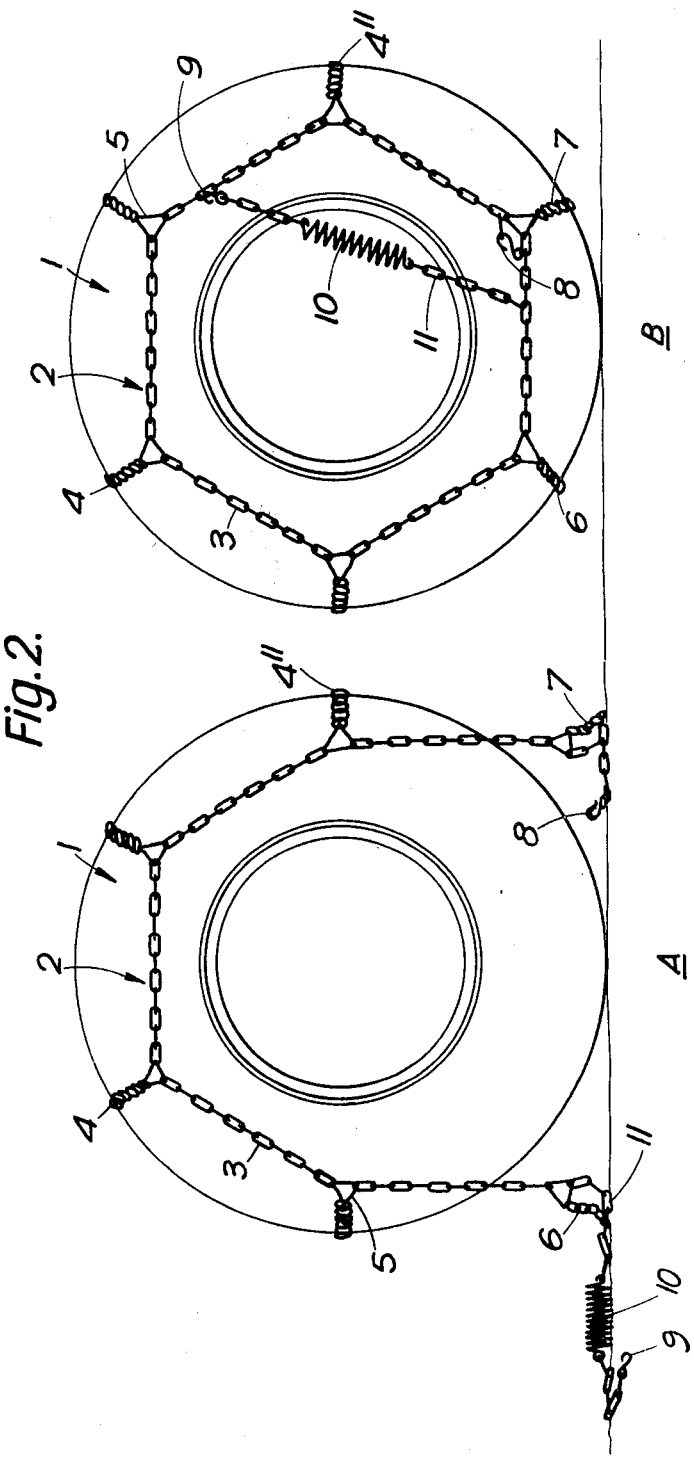

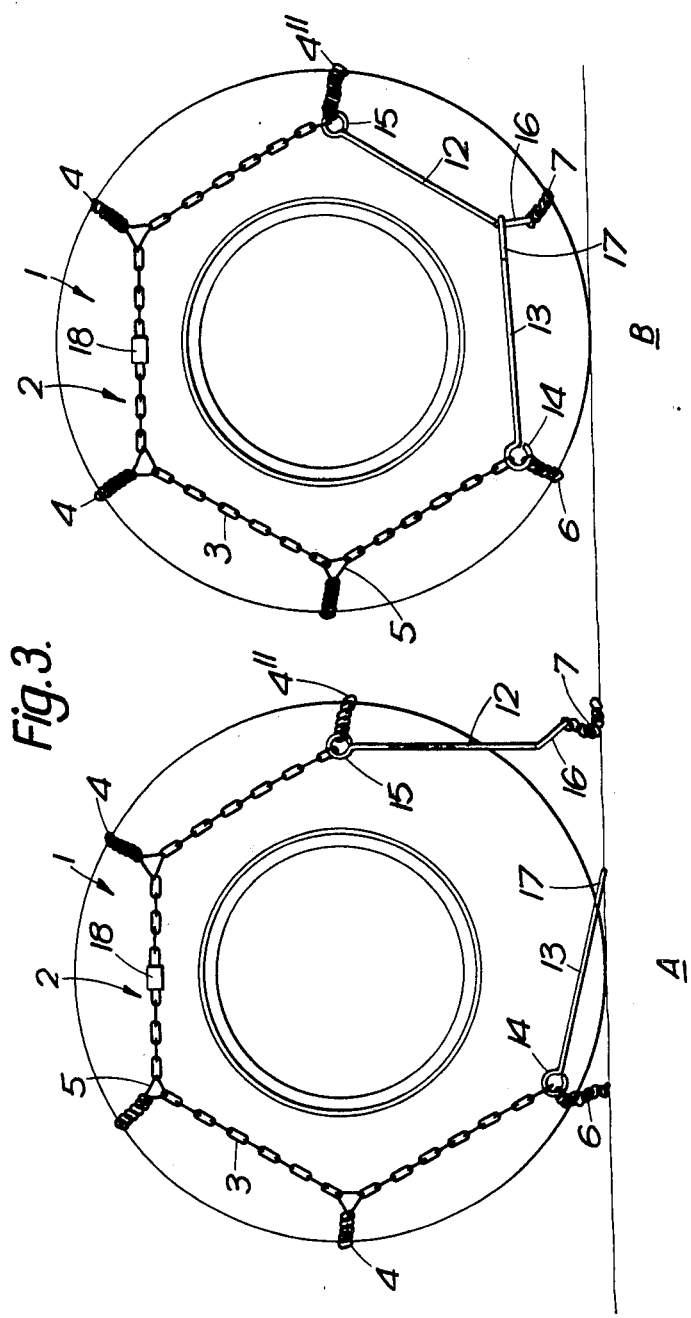

DEVICE FOR TIRE CHAINS

FIELD OF THE INVENTION

The invention relates to a device for a laterally divisible tire chain, with a tread comprising gripping elements and with side-chains, and where the side chains on the rear side comprise an attaching bracket consisting of two elements which can be fastened into each other.

DESCRIPTION OF THE PRIOR ART

Many different types of tire chains are known. The majority of these are however relatively awkward to put on, as the vehicle has to be jacked up or moved in order to get the chain properly in place, and it is often necessary to crawl under the vehicle to lock together the ends of the chains.

Various devices are known in addition for tire chains which claim to facilitate attaching, and which are known as quick chains. An example of such a chain is shown in the U.S. Pat. No. 3,053,303. The type of chain shown in the U.S. Patent has a loopshaped element on the back of the tire, which element can from one side be stuck in behind the wheel to which the chain is to be fastened and which is to be fastened together with a locking element in the other end of the chain. In this embodiment it is not necessary to move the vehicle in order to put the chain in place, but in order to fasten together the attaching loop and the locking device, it is necessary to use both hands at the same time on the back of the wheel. This means that one still has to kneel down on the ground and work behind the wheel, which is inconvenient and not entirely simple.

The problem which therefore is the basis for the present invention is to provide a tire chain for vehicles which can be mounted simply and easily without it being necessary to move the vehicle. The aim is also to provide a device which can be attached even if the vehicle is stuck, or which can be attached and dismantled quickly and easily when tackling slippery hills or the like.

The tire chain should also be able to be put on by anyone without tools and without it being necessary to lie down on the ground.

An additional problem which is the underlying basis for the invention is to find a device for chains which can be used just as well for a traditional snow-chain with many gripping elements as for the quick chain with few gripping elements, which is intended for emergencies. Any chain pattern whatsoever can be used in the tread.

The interlocking of the chain should moreover be simple and easy and also be secure under all circumstances.

Chains are known today which fulfill certain of the requirements stated above, but none of these fulfill all requirements.

SUMMARY OF THE INVENTION

The purpose of the invention is therefore to provide a device for a tire chain which makes it as simple and easy as possible to join together this chain with one hand only on the back of a wheel, while crouching in front of the wheel so that one can support oneself with the other hand if this should be necessary. Moreover, the device is to be made in such a way that the chain can be easily adjusted for use on several sizes of tires.

These intentions are achieved with a device which is characterized as stated in the claims.

BRIEF DESCRIPTION OF THE DRAWINGS

The invention will be explained in greater detail with reference to an embodiment which is depicted in the drawings in which:

FIG. 1 shows a tire chain with a device according to the invention seen as a tracing.

FIG. 2 shows the tire chain in FIG. 1, seen from the front side of a wheel, placed on the wheel, before and after being mounted respectively.

FIG. 3 shows the same as FIG. 2, but seen from the back of the wheel.

FIGS. 4 and 5 show attachment elements which are used in the device according to the invention, seen in two drawings, at right angles to one another.

DESCRIPTION OF THE PREFERRED EMBODIMENT

A tire chain 2 equipped with the device according to the invention is shown in FIG. 1. The chain 2 consists of side-chains 3 which are coupled by means of a triangular connecting link or hooks 5, and where between the links lying across from each other are placed gripping elements in the form of cross-chains 4. On so-called emergency and/or quick chains these gripping elements or cross chains 4 can be relatively widely spaced, while on usual snow-chains they can be placed more closely together, as indicated by 4'. The chain links are for clarity reasons drawn too large. The last gripping element at each end of the chain 2 is designated by 6 and 7 respectively. On one end of the side of the chain which is to be placed on the outside of the wheel, is placed at the cross-chain 7 an attaching or locking hook 8 of a known type, while at the other end is placed an extension of the chain 11 which is connected with a spring 10 and a hook 9.

On the other side of the chain, which is to be placed on the inside of the wheel, the last side-chain at the end with cross-chain 7 is replaced with a smooth metal bar 12 which is formed with eyes 15 and 16 in the two ends. The eyes 15 and 16 are turned 90° in relation to each other, and the eye 16 is in addition angled outwards. At the other end, the end with the cross chain 6, is fastened a bar-shaped element 13 as an extension of the side-chains 3, which element is connected with the cross-chain 6 by an eye 14. In the outer end of the bar 13, a U-shaped hook is formed by a simple backward bending of the end of the bar.

The use of the chain is shown in FIGS. 2 and 3, where FIGS. 2A and 3A show the chain placed on a tire 1 seen from the outside and the inside respectively before mounting, and FIGS. 2B and 3B show the chain already mounted.

Chain 2 is placed across the wheel 1. On the outside of the wheel, the end of the chain then hangs down toward the ground on the one side with the attaching hook 8 and cross-chain 7 and on the other side the cross-chain 6 with the fastening parts 9-11.

On the back of the wheel the attaching bar 13 is put in behind the wheel and in toward the latter, so that the attaching bar almost sticks out on the opposite side. The bar 12 hangs down toward the ground, as shown in FIG. 3A.

When fitting on the chain one crouches down, puts one's hand in behind the wheel between the latter and the bar 12 and one takes hold of the hook 17 on the attaching bar 13. This is lifted upwards and toward the bar 12 which is left lying against the outside of one's hand. The hand is then turned and the bar 12 is tipped in toward the attaching bar 13 with the hook 17. The attaching bar 13 is released and the hook 17 is hooked around the bar 12. The attaching bar 13 thereupon slips down toward the eye 16 on the bar 12 and locks the side-chains together on the back of the wheel. Whereupon the fastening is done on the front, as hook 8 is fastened to the side chain 3 at the cross-chain 6 and is tightened by a tightener known per se, whereupon the whole device is tightened by means of chain 11 by the spring 10 and hook 9 which is fastened in a suitably taut position to the side 3 lying opposite. On the back side of the chain is diagrammatically indicated a lock 18 for adjusting the size of the tire chain to different tire sizes. This lock is set once and for all to the dimensions the chain is to be used for.

The attaching bars 12 and 13 are now locked securely together. The cross-chains 6, 7 and 4" are fastened in the eyes 14, 16 and 15, respectively, and will hold the eyes in an outward direction and will accordingly hold these in toward the tire at the same time as the abutting side chains 3 are pulled in a 90° angle against the cross-chains. The attaching bars 12 and 13 engage with each other at the eye 16, which presses these in toward the tire, and the connection cannot be loosened without breaking the side-chain connection on the one side. When driving with a slack chain the centrifugal force will force the tire chain outward and press the bars 12 and 13 outward and against the tire. The same thing will happen when backing and going forwards. The side chains take hold, press the hooks against the tire at the same time as the pressure is transmitted through the side chain and pulls in the opposite direction.

In order to regulate the attachment point for the cross chains 6 and 7 completely down against the transition between the tire and the surface of the road, an adjustment is made of the adapting locking device 18. By regulating the placing of the attaching bar 13 so that the cross chains 6 and 7 lie furthest in toward the tire and the surface of the road, and by tightening on the front, the cross chains 6 and 7 will be pulled in under the tire, and when driving, the tightening spring will pull the cross chains 6 and 7 a little further in, and said cross chains will always be in contact with the road, as the said chains will lie in a V-shape with the outside of the wheel at the attaching bar 13.

The bars 12 and 13 can be given various embodiments, but the principle will always be the same. In principle, the remaining side chains 3 can also be replaced with bars or the like with the exception of the locking devices. The side-chains can also be covered with a plastic coating and will then tend less to become entangled.

Having described my invention, I claim:

1. A tire chain permitting quick and easy attachment to the wheel of a car, comprising:
two side chains, a first chain for placement on the outer side of the wheel and a second side chain for placement on the inner side of the wheel, each of said side chains being made of a plurality of side chain segments;
gripping elements connected between said side chains;
connecting means for connecting the ends of said first side chain when in place around the tire;
a first bar forming the last said side chain segment of said second side chain, said first bar having a first eye on one end thereof and a second eye on the other end thereof; said first eye connecting said first bar to the rest of said second side chain, and said second eye forming the end of said second side chain, said second eye also connecting the endmost of said gripping elements, said second eye being turned 90° in relation to said first eye and being disposed at an angle with respect to the longitudinal axis of said first bar;
a second bar connected to the other end of said second side chain, said second bar having an eye connecting said second bar to the end of said second side chain opposite said first bar; and
a U-shaped hook at the end of said second bar, said U-shaped hook being turned 90° in relation to the eye of said second bar;
whereby the tire chain is attached to the wheel by placing the tire chain across the wheel with said first side chain on the outer side of the wheel, said U-shaped hook on said second bar is hooked around said first bar so that said second bar rests in a locking position against said second eye, said second eye lying outside said U-shaped hook of said second bar, so that said second side chain is locked together on the back of the wheel, and said first side chain is connected together on the outer side of the wheel by means of said connecting means.

2. The tire chain according to claim 1 wherein said angle which said second eye forms with the longitudinal axis of said first bar is approximately 45°.

3. The tire chain according to claim 1, wherein said gripping elements are cross-chains.

* * * * *